J. RIDGE.
Improvement in Carriage-Wheels.
No. 130,074.  Patented July 30, 1872.
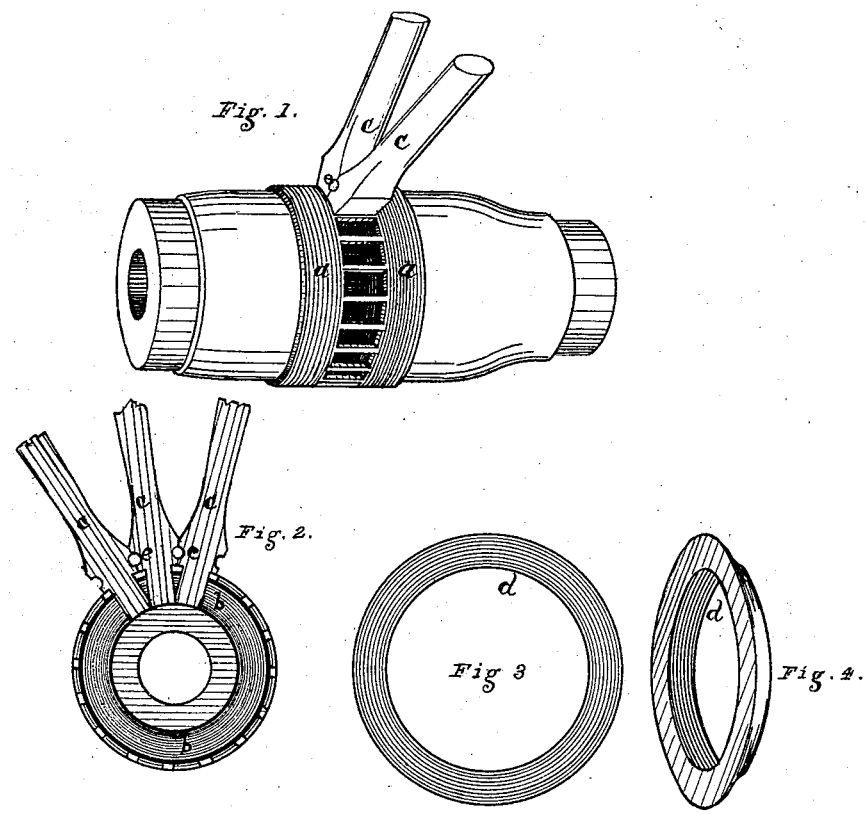
WITNESSES.  INVENTOR.
Wm Aldin Mote
Elisha J. Mote
Joseph Ridge

UNITED STATES PATENT OFFICE.

JOSEPH RIDGE, OF RICHMOND, INDIANA.

IMPROVEMENT IN CARRIAGE-WHEELS.

Specification forming part of Letters Patent No. 130,074, dated July 30, 1872.

Specification describing certain Improvements in Carriage-Wheels, invented by JOSEPH RIDGE, of Richmond, Wayne county, Indiana.

My invention relates to that class of carriage-wheels in which the desiderata are neatness and strength, obtained by using a small wooden hub, with the spokes arranged therein in a single line, and supported by metal flanges or collars. The object of my invention is to cheapen the construction of such wheels, and add strength and durability thereto. This I accomplish by dispensing with the mortises in the hub, and thus, as the inner portion of the hub surrounding the axle-box is left intact, the trouble resulting from the lubricating oil reaching the tenons of the spokes, and thereby destroying their adhesion with the hub, is obviated. This method also cheapens the construction of the wheel by reason of dispensing with the labor of mortising. In lieu of mortising, a channel, $b$, is turned around the hub, in which the ends of the spokes $c$ rest. This channeling may, of course, be done as a part of the operation of turning the hub, and without any additional expense. The wheel is constructed with the spokes arched around the hub, and to give additional strength to the connection of the hub and spokes over what is obtained by the channel and flanges or collars, holes are made through the arch at the junctions of the spokes with each other, and pins are driven tightly in, or wood screws are inserted.

Of the accompanying drawing, Figure 1 is a perspective view of the hub with a portion of the spokes inserted. Fig. 2 is a cross-section of the hub through the line of the spokes. Figs. 3 and 4 are flanges or collars.

According to the accompanying example, it will be seen that a mortised metal band, $a$, is driven on the hub, so that the mortises of said band are over the channel $b$ of the hub, the spokes $c$ being tenoned so as to fit the said mortises, into which they are tightly driven. The lower ends of the tenons rest on the solid part of the hub at the bottom of the channel, and are in contact with each other at that point. The pins or screws $e$, when inserted in the arch, as shown, at points surrounding the hub, serve to key the spokes together in such a manner that the latter mutually support each other, and give greater strength to the wheel than the mortised hub and tenons. The flanges or collars $d$ in the accompanying example are screwed on band $a$ against the faces of the spokes. The object of the channel $b$ being to secure the inner ends of the spokes in line, it may be a simple quadrangular groove, or may be V-shaped, the apex being outward, and the ends of the spokes notched to correspond.

Having fully described my said invention, what I claim, and desire to secure by Letters Patent, is—

A hub having a channel or groove, $b$, in combination with arched spokes $c$, tenoned through a metal band, $a$, and supported by flanges $d$, substantially as set forth, for the purpose specified.

JOSEPH RIDGE.

Witnesses:
SAMUEL C. BROWN,
ETHAN C. KELLY.